(12) United States Patent
Subedi

(10) Patent No.: US 11,893,427 B2
(45) Date of Patent: Feb. 6, 2024

(54) METHOD FOR DETERMINING AND NOTIFYING USERS OF PENDING ACTIVITIES ON CRM DATA

(71) Applicant: Clari Inc., Sunnyvale, CA (US)

(72) Inventor: Mahesh Subedi, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 168 days.

(21) Appl. No.: 16/398,963

(22) Filed: Apr. 30, 2019

(65) Prior Publication Data
US 2020/0125424 A1   Apr. 23, 2020

Related U.S. Application Data

(63) Continuation-in-part of application No. 16/163,519, filed on Oct. 17, 2018.

(51) Int. Cl.
| | |
|---|---|
| G06F 9/54 | (2006.01) |
| G06Q 10/107 | (2023.01) |
| G06N 20/00 | (2019.01) |
| G06N 3/08 | (2023.01) |
| G06Q 10/0631 | (2023.01) |

(52) U.S. Cl.
CPC .............. *G06F 9/542* (2013.01); *G06N 3/08* (2013.01); *G06N 20/00* (2019.01); *G06Q 10/063114* (2013.01); *G06Q 10/107* (2013.01)

(58) Field of Classification Search
CPC ......... G06Q 10/107; G06Q 10/063114; G06N 20/00; G06N 3/08; G06F 9/542
See application file for complete search history.

(56) References Cited

U.S. PATENT DOCUMENTS

| | | | |
|---|---|---|---|
| 10,977,258 B1 * | 4/2021 | Liu ...................... | G06V 40/172 |
| 2007/0266321 A1 | 11/2007 | Bicker et al. | |
| 2008/0034354 A1 * | 2/2008 | Brughton .............. | H04M 3/523 |
| | | | 717/139 |
| 2008/0270761 A1 * | 10/2008 | Rasmussen ............ | G06Q 10/10 |
| | | | 712/209 |
| 2012/0221596 A1 | 8/2012 | Hall et al. | |

(Continued)

FOREIGN PATENT DOCUMENTS

EP    2973380 A2 *    1/2016    ........... G06Q 10/107

*Primary Examiner* — Hosain T Alam
*Assistant Examiner* — Anthony G Gemignani
(74) *Attorney, Agent, or Firm* — WOMBLE BOND DICKINSON (US) LLP

(57) ABSTRACT

The disclosure describes various embodiments for determining emails that each need a response based on data from a customer relationship (CRM) system. In one embodiment, a method of determining such emails includes the operations of retrieving open tasks assigned to a user from a task database; determining one or more source email domains for one or more source contacts, and one or more target email domains for one or more target contacts; and determining one or more threads emails exchanged between the source contacts and the target contacts based on the source email domains and the target email domains. The method further includes the operations of creating an email list from the threads of emails, including a latest email from a group that was sent by a target contact; and generating a subset of the list of emails by analyzing contents of each of the list of emails using a machine learning model.

20 Claims, 10 Drawing Sheets

(56) References Cited

U.S. PATENT DOCUMENTS

| | | | |
|---|---|---|---|
| 2013/0007139 A1* | 1/2013 | Bombacino | H04L 51/16 |
| | | | 709/206 |
| 2014/0201126 A1* | 7/2014 | Zadeh | A61B 5/165 |
| | | | 706/52 |
| 2015/0263925 A1 | 9/2015 | Shivashankar et al. | |
| 2016/0337300 A1* | 11/2016 | Ossia | H04L 51/043 |
| 2017/0083179 A1* | 3/2017 | Gruber | G06Q 10/1097 |
| 2017/0171124 A1* | 6/2017 | Brezina | G06Q 10/107 |
| 2017/0220596 A1* | 8/2017 | Smith | G06F 16/184 |
| 2018/0026923 A1* | 1/2018 | Cho | H04L 67/02 |
| | | | 709/206 |
| 2018/0046929 A1* | 2/2018 | Xuan | G06Q 10/00 |
| 2018/0101537 A1 | 4/2018 | Govindarajan et al. | |
| 2018/0276041 A1 | 9/2018 | Bansal et al. | |

* cited by examiner

800

Retrieve, by a cloud server, task metadata describing one or more tasks pending to be completed from a task database hosted by a task management server over a network, the task management server being a different server than the cloud server;
— 801

For each of the one or more tasks, determining based on the task metadata a plurality of user identifiers (IDs) identifying one or more source contacts and one or more target contacts, determining based on the user IDs one or more source email domains for the one or more source contacts, and one or more target email domains for the one or more target contacts, accessing an email server associated with the task over the network to retrieve email metadata describing a plurality of emails associated with the task based on the source and target email domains, the email server being a separate server than the cloud server and the task management server, identifying one or more email threads associated with the task based on the email metadata, each email thread including one or more emails
— 803

For each of the above email threads, identifying a latest email within the email thread based on a timestamp of the email that was sent by a user ID associated with one of the target email domains, determining that the latest email has not been replied by a user ID associated with any one of the source email domains, performing a content analysis on content of the latest email using a machine-learning model, and transmitting a notification to one or more source email addresses associated with the task
— 805

FIG. 8

METHOD FOR DETERMINING AND NOTIFYING USERS OF PENDING ACTIVITIES ON CRM DATA

RELATED APPLICATIONS

This application is a continuation-in-part (CIP) of co-pending U.S. patent application Ser. No. 16/163,519, titled "METHOD FOR CLASSIFYING AND GROUPING USERS BASED ON USER ACTIVITIES", filed Oct. 17, 2018, which is herein incorporated by reference in its entirety.

TECHNICAL FIELD

Embodiments of the present invention relate generally to cloud servers and communication systems. More particularly, embodiments of the invention relate to methods and systems for determining and notifying users of emails that need to be replied to using data from a task database system.

BACKGROUND

In organizations that use a task database system, a user typically uses emails to communicate with outside contacts of tasks assigned to the user. A task in the task database system can be a specific task or a project that may go through multiple predefined stages or cycles before being completed. The progression from one stage to another for a task is largely based on the outcome of the communication with the outside contacts of the task. Despite the emergence of various new forms of communication technologies, email communication remains one of the most popular communication mediums.

Therefore, it is important for a user of the task database system to be aware of any email message that needs to be replied to, because failure to do so could delay the closing of a deal or even ruin the deal.

However, when a user works on multiple tasks simultaneously, the user may send and receive a large volume of email messages. Since the user may be busy in meeting with outside contacts of the tasks and going through various sales cycles to move the sales process forward, the user may not always be able to follow up and reply to email messages addressed to the user in a timely manner. Manually going through each received email messages in an inbox can be time-consuming and may not be effective in catching each email message that needs a reply.

As such, it would be desirable to have a communication system that can automatically determine email messages that needs to be replied to and notify the user of such email messages so that the user can take appropriate actions.

BRIEF DESCRIPTION OF THE DRAWINGS

Embodiments of the invention are illustrated by way of example and not limited to the figures of the accompanying drawings in which like references indicate similar elements.

FIG. 8 illustrates a process for reminding users of emails that each need a response in accordance with another embodiment of the invention.

DETAILED DESCRIPTION

Figure 1:
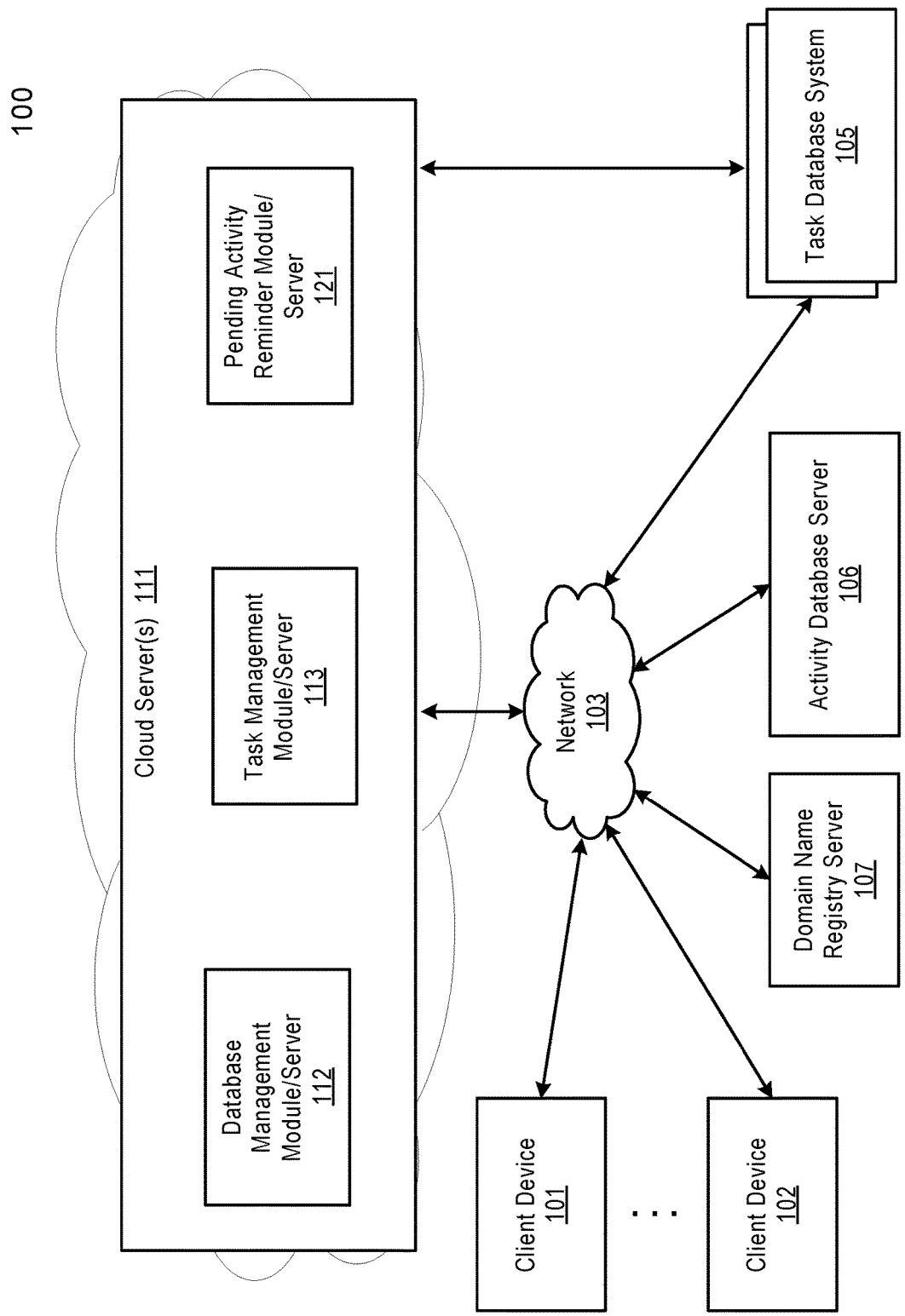
FIG. 1 is a block diagram illustrating a network configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" or "in an embodiment" in various places in the specification do not necessarily all refer to the same embodiment.

The disclosure discloses various systems, methods and computer mediums for determining emails that each needs a response based on task or project data. The various embodiments can remind a user working on multiple tasks to reply to one or more emails to move the tasks forward.

In one embodiment, a method of identifying and notifying users of pending emails includes the operations of retrieving, by a cloud server, task metadata describing one or more tasks pending to be completed from a task database hosted by a task management server over a network, the task management server being a different server than the cloud server; and for each of the one or more tasks, determining based on the task metadata a plurality of user identifiers (IDs) identifying one or more source contacts and one or more target contacts, determining based on the user IDs one or more source email domains for the one or more source contacts, and one or more target email domains for the one or more target contacts, accessing an email server associated with the task over the network to retrieve email metadata describing a plurality of emails associated with the task based on the source and target email domains, the email server being a separate server than the cloud server and the task management server, identifying one or more email threads associated with the task based on the email metadata, each email thread including one or more emails.

The method further includes the operations of for each of the email threads, identifying a latest email within the email thread based on a timestamp of the email that was sent by a user ID associated with one of the target email domains, determining that the latest email has not been replied by a user ID associated with any one of the source email domains, performing a content analysis on content of the latest email using a machine-learning model, and transmitting a notification to one or more source email addresses associated with the task.

In another embodiment, a method of determining such emails includes the operations of retrieving open tasks assigned to a user from a task database; determining one or more source email domains for one or more source contacts, and one or more target email domains for one or more target contacts; and determining one or more groups of emails exchanged between the source contacts and the target contacts based on the source email domains and the target email domains. The method further includes the operations of creating an email list from the groups of emails, including a latest email from a group that was sent by a target contact; and generating a subset of the list of emails by analyzing contents of each of the list of emails using a machine learning model.

In one embodiment, the task database can be an information management system, such as, for example, a customer relationship management (CRM) system, and each task can be a specific task/project in the CRM system pending to be completed.

In one embodiment, the cloud server is configured to exclude emails with a timestamp that is more recent than a predetermined timestamp. The subset of emails is to be displayed to a graphical user interface for the user to respond to. The graphic user interface can be provided by a cloud application or a mobile application. Each email in the subset of emails is displayed within a clickable link, which directs the user to an email client where the user can directly construct a reply message to the email.

In one embodiment, the one or more group emails exchanged between the one or more source email domains and the one or more target email domains are retrieved from the task database in response to the user logging on to the cloud application, or retrieved from a database in the cloud server, where the database is periodically synchronized with an activity database server that stores emails of users of a sales teams or a sales company.

In one embodiment, the machine learning model is a neural network model trained to determine whether a user needs to reply to an email based on contents of a body of the email. The machine learning model can also be a text parser with business rules encoded therein to determine whether an email needs a reply.

In one embodiment, each email in the list of emails from the one or more groups of emails includes metadata of the email without an body, the metadata including one or more of the following: a timestamp, a sender and a receiver, a source email domain, a target email domain, and a subject line. The body of each email in the list of email is to be retrieved from either the database in the cloud server or the task database prior to being analyzed by the machine learning model. The various embodiments described above can also be applied to prospect customers and potential opportunities.

Cloud Server

FIG. 1 is a block diagram illustrating a network configuration according to one embodiment of the invention. Referring to FIG. 1, system 100 includes, but is not limited to, one or more client devices/systems 101-102 communicatively coupled to servers 105-107 and an AI-driven cloud server 111 over network 103. The clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 105-107 can be any kinds of servers or a cluster of servers, such as, for example, Web servers, application servers, cloud servers, backend servers, etc.

Task database server 105 provides CRM services that are periodically or constantly accessed and updated by a variety of client devices/systems for managing their CRM data or other their task management data. The task database system can be a CRM system. The CRM data includes any kinds of customer relationship management data, e.g., data related to tasks and contracts. The CRM services can be provided by a variety of CRM vendors, e.g., SALESFORCE™, SAP AG™, ORACLE™, and MICROSOFT™. A CRM system can compile information on customers across different channels or points of contact between the customer and a company that uses the CRM system. Examples of channels include the company's website, telephone, live chat, direct mail, marketing materials and social media.

In an embodiment, the cloud platform server 111 can be provided between client devices 101-102 and the task database system 105. Users at client devices 101-102 can log in to the cloud server 111 that utilizes services and data provided by the task database server 105. As such, the cloud server 111 can add a layer of intelligence to the task database system 105.

In an embodiment, the cloud server 111 provides a number of predictive algorithms based on AI and machine learning technologies, for use in identifying risks and delivering predictive insights using data gathered from a number of sources. For example, the cloud server 111 can provide users with insights into which tasks are most likely to complete and which tasks are at the highest risk of slipping, to enable the users to focus their resources on the right tasks. The cloud server 111 can provide the above-mentioned insights by analyzing all tasks over a predetermined period of time in the past, e.g., over the past two years, and use a model (e.g., hidden Markov model) and one or more AI classification algorithms to identify patterns and factors that drive those tasks that were successfully completed and those tasks that failed to complete.

The cloud server 111 can perform a number of additional functions using modules executing in the cloud server 1111. As shown in FIG. 1, the cloud server 111 can include a number of modules, for example, a database management module 112, a task management module 113, and a pending activity reminder module 121. Each of the modules can execute on a separate hardware server, a separate virtual machine, or a separate software application server instance. Alternatively, the modules can execute on the same hardware server, the virtual machine or the software application server instance. The modules are provided for illustration purposes. Additional modules and additional functionality for each module can be added without limitation.

In an embodiment, the database management module 112 provides task management to clients 101-102 based on task data from the task database system 105. The database management module 112 can provide one or more services that can be used to initiate or schedule processing threads to synchronize data between activity database system 106 and the task database system 105. The database management module 112 can retrieve activity data from the activity database server 106, perform an analysis on the activity data, and update task data of the task database system 105 based on the analysis of the activity data. The synchronization between the task database system 105 and the activity database server 106 can be performed automatically and periodically using multiple processing threads.

Referring to FIG. 1, the task management module 113 can be used to identify activities of a task associated with one of client devices 101-102. The task database system 105 can be queried to obtain a task associated with an entity (e.g., a user, a group of users, a customer). A first list of one or more contacts (e.g., contact persons, referred to hereinafter as target contacts) associated with the task from the task database system can be identified. For each of the contacts in the first list, a domain name can be determined based on contact information of the contact (e.g., emails, Web addresses, name of an account associated with the contacts). A first set of email addresses, referred to as target email addresses, can be determined based on the domain name and contacts using a set of activity identification rules. The activity database server 106 can subsequently be queried to retrieve a list of one or more emails and/or calendar events based on the first set of email addresses.

In one embodiment, the pending activity reminder module module 121 can determine emails that each need a response based on data from a customer relationship (CRM) system. In one embodiment, a method of determining such emails includes the operations of retrieving open tasks assigned to a user from a task database; determining one or more source email domains for one or more source contacts, and one or more target email domains for one or more target contacts; and determining one or more groups of emails exchanged between the source contacts and the target contacts based on the source email domains and the target email domains. The method further includes the operations of creating an email list from the groups of emails, including a latest email from a group that was sent by a target contact; and generating a subset of the list of emails by analyzing contents of each of the list of emails using a machine learning model.

User Activity Retrieval

As used herein, a user is a person who is responsible for completing a task in the task database system 105. User activity can be emails exchanged between a user of a task and one or more contacts (outside parties) associated with the task; and past meetings and scheduled meetings between the user and the one or more contacts. As described above, task management module 113 can be used to identify and retrieve user activities associated with a task.

Figure 2A:
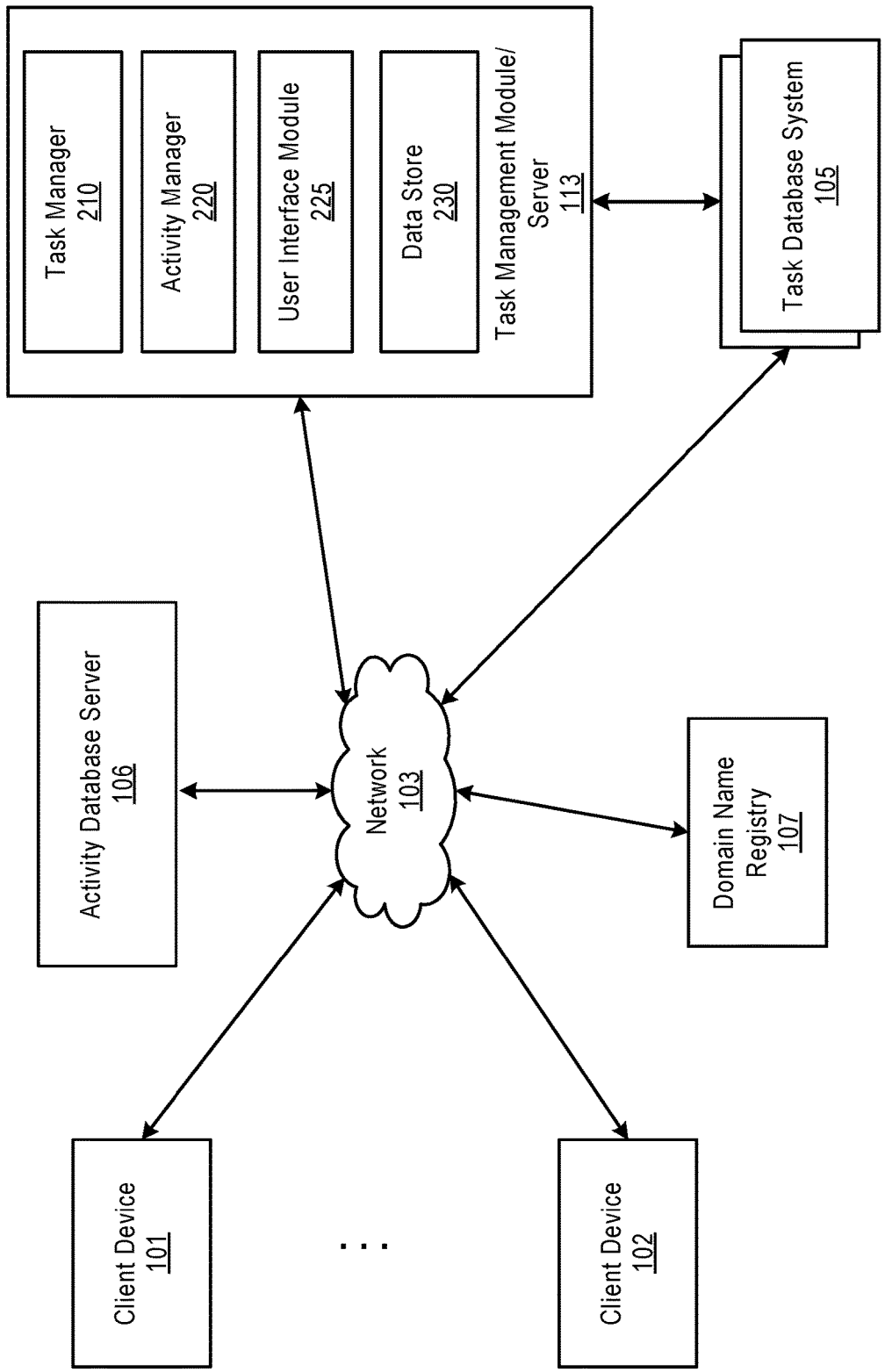
FIGS. 2A and 2B further illustrate the task management module 113 described in FIG. 1, in accordance with an embodiment of the invention.

FIG. 2A further illustrates the task management module 113 described in FIG. 1, in accordance with an embodiment of the invention. In an embodiment, the task management module/server 113 in system 200 can provides services including task management and activity management to clients 101-102 by utilizing data and services provided by the task database system 105. Although there is only one task database system shown in FIG. 2A, multiple task database systems can be used to support the task management server/module 113, which can be implemented as a multi-tenancy system.

In an embodiment, the multi-tenancy system can access multiple task database systems concurrently over network 103. For example, a user of client device 101 may be associated with a first organization as a first corporate client to the task management module 113, while a user of client device 102 may be associated with a second organization as a second corporate client to the task management module 113. The first and second organizations may use different ones of the multiple task database systems.

In one embodiment, the task management module 113 can include a task manager 210, an activity manager 220, a user interface module 225, and a data store 230. The task manager 210 is configured to interact with the task database system 105 to access and manage tasks hosted by the task database system 105. The activity manager 220 is configured to determine any activities associated with a particular task, such as emails and calendar events. The user interface module 225 provides a user interface, which can be any kind of user interface (e.g., Web, graphical user interface or GUI, or command line interface or CLI) that allows users of client devices 101-102 to access services provided by the task management module 113. The services can be used to automatically identifying activities associated with a task. The identified activities can be presented by the user interface module 225 on a graphical user interface (GUI) at a client device that accesses the task management system 113.

The data store 230 stores or caches data of a variety of tasks. The data may be periodically updated from a number of corresponding data source(s) or data provider(s). Alternatively, the task manager 210 and/or activity manager 220 may directly access the task database system 105 to query and retrieve the data. The data stored in the data store 230 can be maintained in a variety of data structures, such as tables or databases. The task manager 210 and/or activity manager 220 can access data store 230 via a variety of application programming interfaces (APIs), database queries, or other suitable communication protocols (e.g., structured query language or SQL).

According to one embodiment, the activity manager 220 is configured to identify activities of a task associated with a user by invoking the task manager 210, which communicates with the task database system 105 to determine target email addresses of a prospect customer or an existing customer. The activity manager 220 also determines source email addresses of users associated with the task. For the source email addresses and target email addresses, the activity manager 220 can automatically query the activity database server 106 to determine email and meeting activities associated with the task. The activity manager 220 can automatically populate these activities as soon as meetings have been scheduled and/or emails have been exchanged at the activity database server 106.

Figure 2B:
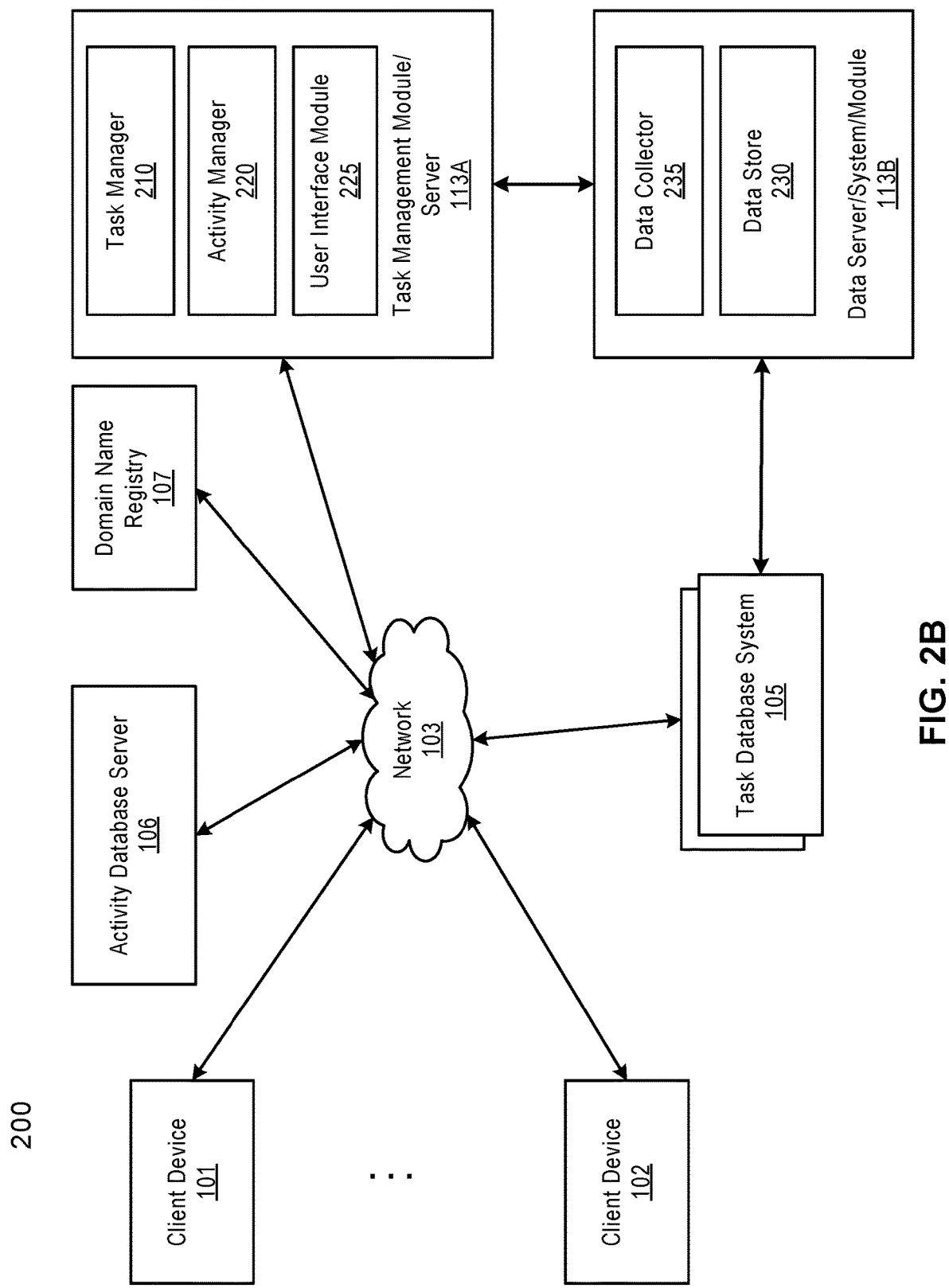

Although in this embodiment, the data store 230 is maintained by the task management system 113, the data store 230 can be maintained in a dedicated data server that is a separate server from the task management server/module 113 as shown in FIG. 2B.

Referring now to FIG. 2B, in this embodiment, the task management server 113 and the data store 230 are implemented as separate servers 113A and 113B, which may be operated by the same or different organizations or entities. The data server 113B can include a data collector 235 configured to periodically or constantly collect or update data from the task database system 105. The task management server 113A communicates with the data server 113B using a variety of communication protocols to access task data stored in data store 230.

Figure 3:
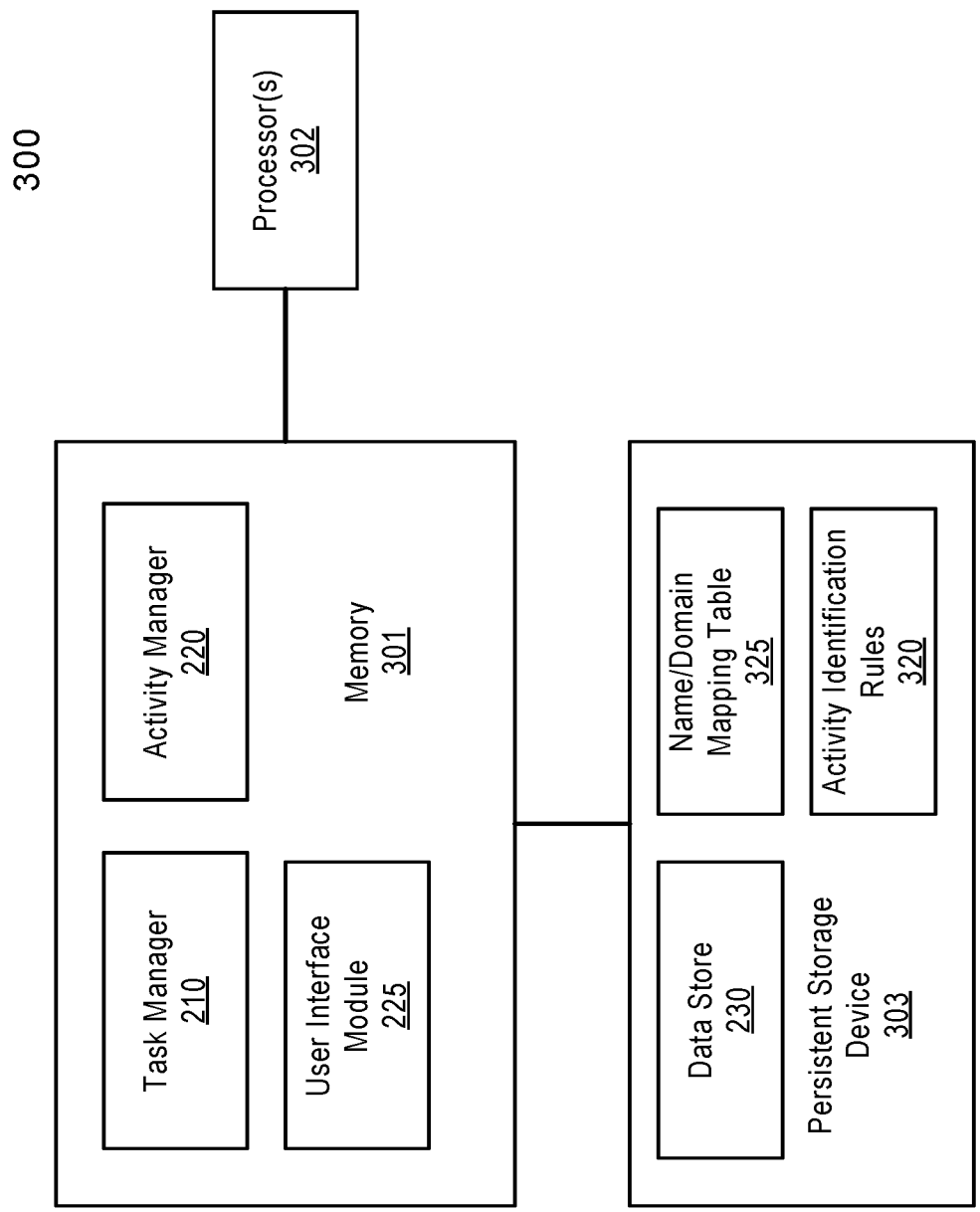
FIG. 3 is a block diagram illustrating an example of a task management system according to one embodiment of the invention.

FIG. 3 is a block diagram illustrating an example of a task management system according to one embodiment of the invention. System 300 may be implemented as part of a task management system or server 113. Referring to FIG. 3, system 300 includes the task manager 210, the activity manager 220, and the user interface module 225 loaded in memory 301 (e.g., volatile memory such as random access memory or RAM) and executed by one or more processors 302 (e.g., microprocessors, central processing units or CPUs). The data store 230 is maintained in persistent storage device 303, such as a hard disk, which may be maintained locally or remotely over a network. At least a portion of data stored in the data store 230 may be cached in memory 301.

Referring now to FIGS. 2A-2B and 3, the task manager 210 queries the task database system 105 to obtain a list of tasks that are associated with a particular entity (e.g., a user, a group of users, and a customer). The task database system 105 can be associated with or utilized by a user that works as a sales representative.

For example, a team manager of a sales team having one or more team members can log into the task management system 300, and in response to the login, the task manager 210 can communicate with the task database system 105 to retrieve a list of tasks assigned to one or more of the team members.

In one embodiment, when the task manager 210 queries the task database system 105, the task manager 210 can send a query request to the task database system 105. The query request can include a number of parameters that specify one or more attributes of the tasks to be queried and retrieved. In response to the query request, the task database system 105 operates to return the list of tasks.

For example, the task manager 210 can query the task database system 105 by specifying that only account contacts of a particular account should be retrieved or only contacts of a particular task should be retrieved. Alternatively, the task manager 210 may perform filtering of accounts and/or tasks to identify the tasks.

Figure 4:
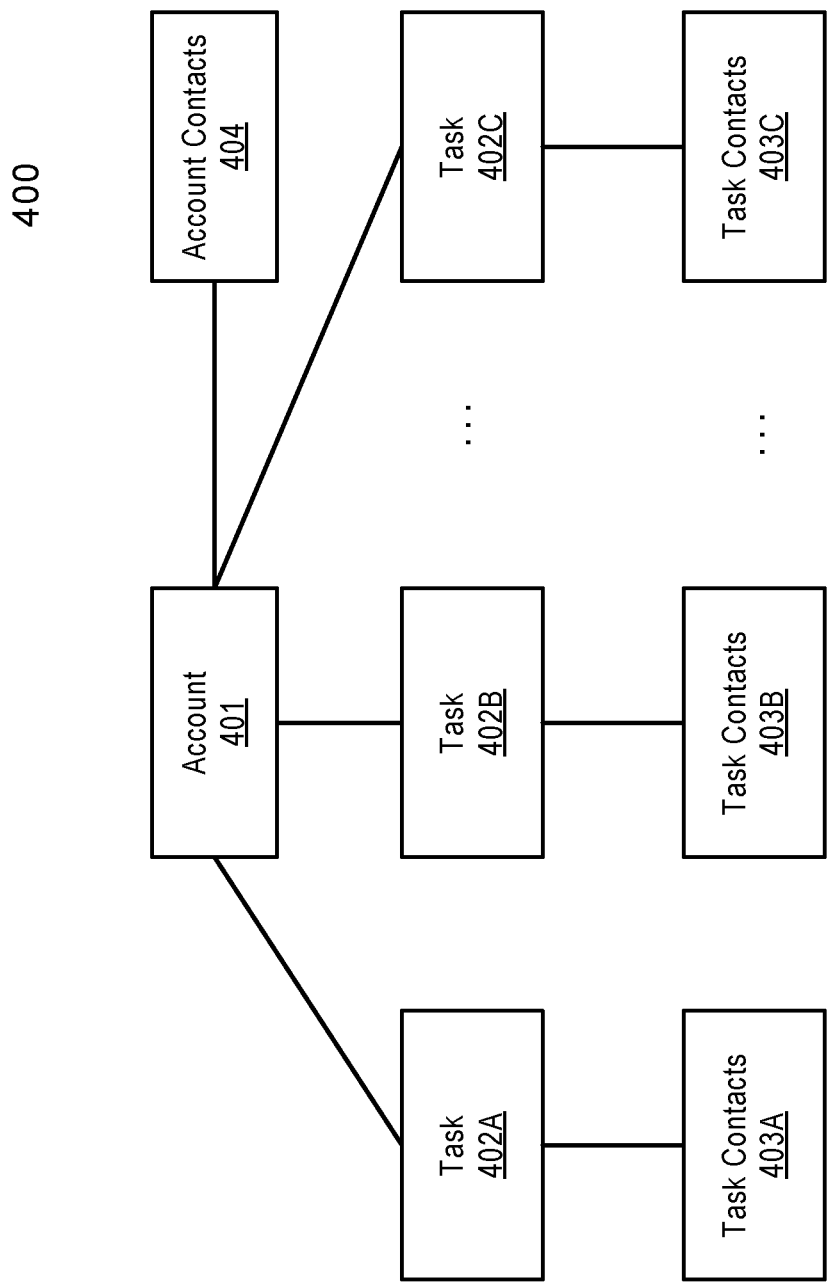
FIG. 4 illustrates an exemplary account in accordance with an embodiment of the invention.

FIG. 4 illustrates an exemplary account in accordance with an embodiment of the invention. As shown in FIG. 4, an account 401 may be associated with one or more tasks 402A-402C. For example, the account 401 may belong to a sales company that has potential tasks 402A-402C being concurrently processed. The account 401 may be managed by one or more persons at an account level, referred to as account contacts 404. Each of the tasks 402A-402C may be managed by one or more persons at a task level, referred to herein as tasks contacts, such as task contacts 403A-403C. Different people may be associated with account contacts 404 and task contacts 403A-403C. Alternatively, a single person can be a part of both account contacts 404 and any one or more of task contacts 403A-403C. Each of account contacts 404 and task contacts 403A-403C may include one or more email addresses of the contact and/or a Web site associated with the account or task. These contact information may be stored in the task database system 105 and can be accessible via queries.

For each of the tasks (e.g., tasks 402A-402C of FIG. 4), referring back to FIGS. 2A-2B and 3, the task manager 210 can query the task database system 105 to obtain a first list of one or more target contacts associated with the task (e.g., task object). For the target contacts in the first list, the activity manager 220 can determine a domain name based on contact information of the contacts (e.g., emails, Web addresses, name of an account associated with the contacts). A first set of email addresses, referred to as target email addresses, can be determined based on the domain name and target contacts using a set of activity identification rules 320. An email server (e.g., implemented as part of the activity server 106) can be queried to retrieve a list of one or more emails based on the first set of email addresses.

In one embodiment, in this disclosure, each task in the task database system 105 can be associated with a source contact and one more target contacts. A source contact refers to a person that is responsible for the task within a sales organization. An example source contact is a sales representative that works on a task. As such, a source contact in this disclosure can be used interchangeably with a user. A target contact can be an outside party; for example, a person that a user needs to work with when completing a task. In one embodiment, a target contact can be a point of contact on the side of a customer associated with a particular task.

In one embodiment, in determining the email address of a target contact associated with a task, if the target contact includes an email address of the target contact, the email address would be directly used in identifying the activities (e.g., email communication). The domain name can be extracted from the email address can be used to identify email addresses of other target contacts associated with task. However, in some situations, the target contact information stored in the task database system 105 may not include an email address of the target contact. In such a scenario, the domain name can be derived from other information (e.g., name, notes, Web address, phone number, social network such as Facebook®, Twitter®, LinkedIn®, etc.) associated with the target contact.

The activity identification rules 320 may specify a preference or priority order indicating which of the contact information should be used in order to identify a domain name. For example, activity identification rules 320 may specify that a target contact should be used to determine a domain name over the account contact, and that the account contact will be used only if the target contact is unavailable.

In an embodiment, the activity identification rules 320 may be different for different customers, different accounts, and/or different tasks; and can include a first set of rules for identifying source email addresses and a second set of rules for identifying target email addresses. Further, the email identifying rules 320 may be configurable by an administrator via a configuration interface such as a CLI or Web interface.

In one embodiment, in determining a domain name for a customer, the activity manager 220 first determines whether there is any target contact associated with a task under a corresponding account for the customer. If there is, the activity manager 220 can determine the domain name based on the target contact; if there is not, the activity manager 220 determines the domain name based on an account contact associated with the account to which the task belongs. The domain name may be obtained from an email address or other information of the account contact. In this example, the activity identification rules 320 associated with this task may specify that a task contact should be utilized over an account contact in determining a domain name.

In one embodiment, if there is no account contact associated with the account of the task, the activity manager 220, depending on the activity identification rules 320, may determine the domain name based on a Web address of a Web site associated with the account. The Web address may also be obtained from the task database system 105 as a part of account contact information of the account associated with the task.

According to one embodiment, if there is no Web address obtained from the task database system 105, the activity manager 220 determines the domain name from a domain name registry, such as domain name registry 107, based on an account name of the account. Typically, if the account has been registered in the domain name registry (e.g., WHOIS™), the registered domain name is typically registered under a particular name. Based on the account name, a registered domain name may be obtained from domain name registry 107.

If there is no registered domain name based on the account name, the activity manager 220 utilizes a name-to-domain (name/domain) mapping table 325 to obtain the domain name based on the account name. In one embodiment, name/domain mapping table 325 includes a number of mapping entries, where each mapping entry maps a particular name to a domain name. Name/domain mapping table 325 may be maintained and updated over time to map a name to a domain name, especially when a name is not related to a domain name from its appearance.

In one embodiment, the activity manager 220 further determines a second list of one or more source contacts associated with each task via the task manager 210 from the task database system. The second list of source contacts are contacts for one or more team members of a sales team that work with one or more target contacts for the task. A source contact can be an owner of the task, a sales representative, and/or an account representative. A second set of email addresses associated with the source contacts of the second list can be determined by the activity manager 220, where the email addresses of the second list are referred to as source email addresses.

In one embodiment, after obtaining the first set of email addresses and the second set of email addresses, the activity database server 106 can be queried based on the source email addresses and the target email addresses to obtain a list of emails that have been exchanged between the source email addresses and the target email addresses (e.g., senders and recipients).

In one embodiment, only email exchanged between the source email addresses and the target email addresses associated with the same task are to be retrieved. In some situations, a source contact may need to handle multiple tasks of different accounts and/or different customers. Similarly, a target contact may handle multiple tasks of an account or multiple accounts. The activity manager 220 can retrieve emails pertinent to a same task can by matching the exact source email addresses and target email addresses for the same task.

In one embodiment, if emails are exchanged prior to the creation of the task, such emails can be removed from the list of emails, snice the emails are not unlikely related to the task. In addition, contacts for a broker or a product reseller or a distributor would not be utilized in determining the domain name for the purpose of identifying emails of the task.

For example, if a particular contact is associated with more than a predetermined number of accounts (e.g., five accounts), such a contact is deemed to be a broker or reseller or distributor and is deemed not to be a proper target contact or source target. Similarly, if a task has been closed, the task would be removed and the emails associated with the task would not be retrieved.

Pending Activity Reminder

Figure 5:
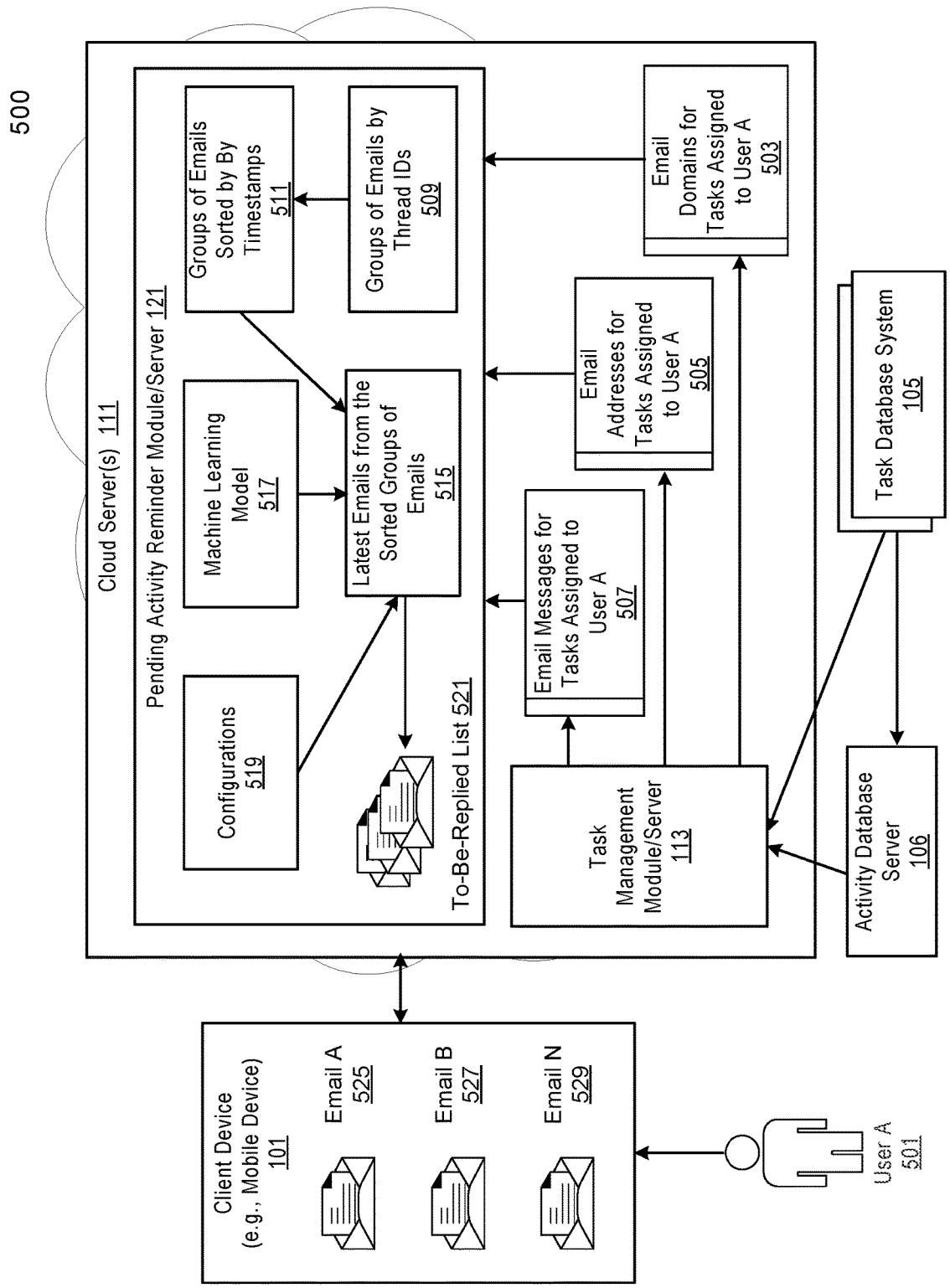
FIG. 5 illustrates an example system for reminding users of emails that each need a response in accordance with an embodiment of the invention.

FIG. 5 illustrates an example system 500 for reminding users of emails that each need a response in accordance with an embodiment of the invention.

As shown in FIG. 5, a user (e.g., user A 501) can interact with the client device 101 (e.g., a mobile device) with a mobile application running thereon. The client device 101 can receive updates from the cloud server 111 for pending activities in the cloud server. Examples of the pending activities can include newly scheduled meetings and emails that each need the user's attention.

In one embodiment, the cloud server 111 can connect to the task database system 105 to determine open tasks assigned to a user in response to the user logging on to the cloud server 101, and to determine source contacts and target contacts of the open deals.

The cloud server 111 can further determine emails domains 503 for the open tasks, including source email domains for the source contacts and target email domains for the target contact. Email addresses 507 for the tasks can also be determined by the pending activity reminder module 121. The emails addresses 505 can include one or more target email addresses that are determined based on the target email domains and the target contacts, and one or more source email addresses determined based on the source email domains and the source contacts. Email messages 507 associated with the open tasks can be located in the activity database server 106 based on the email addresses 505.

The pending activity reminder module 121 can subsequently identify one or more email threads (i.e. groups) 509 from the email messages 507, and sort each email thread in a reverse chronologically order, with the most recent email on the top of the sorted group of emails. In one embodiment, an email group represents an email thread with a thread ID, and includes email messages exchanged between a source contact and one or more target contacts. The first email in an email group can be an email message sent by a source contact or received by a source from a target contact. The remaining emails in the group can include emails exchanged between the source contact and the target contact.

For each email thread, the pending activity reminder module 121 can determine whether the latest email is written by a source contact or a target contact. If the latest email is written by a target contact, that latest email can be included in an email list 515.

The pending activity reminder module 121 can trim the email list 515 by excluding those emails with timestamps that are more recent than a predetermined timestamp. The predetermined timestamp can be configured by configuration settings 519.

For example, based on the configuration settings 519, the pending activity reminder module 121 can remove any emails that are less than 5 days old. Therefore, even if an email message is the latest email from one of the sorted email groups 511, that email is still to be excluded from the email list 515 since it was received during the last 5 days.

In one embodiment, the email list 515, after being trimmed, can be provided as an input to a machine learning model 517, which analyzes the content of the body of each email to determine if it needs a response. The machine learning model 517 can be a neural network model trained on datasets generated by a number of sales teams over a period of time within a sales organization, and therefore the machine learning model 517 can make intelligent decisions as to which types of emails need a response and which types of emails do not.

In one embodiment, the machine learning model 517 can be a software module with rules specifying which types of emails need a response. For example, if the only text in the body of an email is "thank you", the machine learning model 517 can determine that the email does not need a reply.

After applying the configurations 519 and the machine learning model 517 to the email list 515, the pending activity reminder module 121 can generate a to-be-replied email list 113 and displays the email list 113 to a graphical user interface as emails 525, 527, and 529 for the user to take action.

As described above, the pending activity reminder module 121 can generate an email list that needs a response for user A 501 each time the user logs on to the cloud server. Alternatively, the pending activity reminder module 121 can execute at a configurable interval to alert the user of any email that needs a response.

Figure 6:
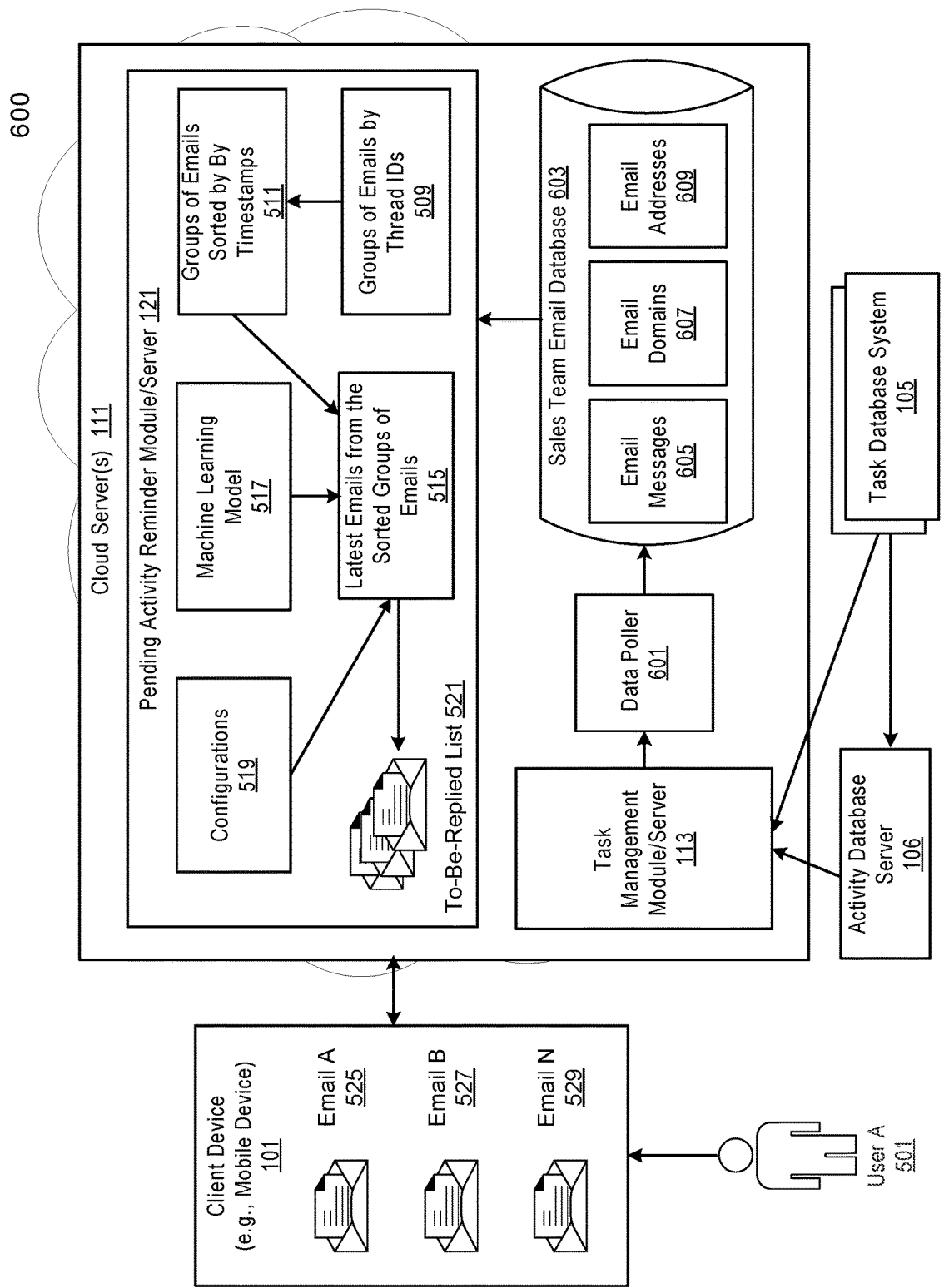
FIG. 6 illustrates another example system for reminding users of emails that each need a response in accordance with another embodiment of the invention.

FIG. 6 illustrates another example system 600 for reminding users of emails that each need a response in accordance with another embodiment of the invention.

In this embodiment, the cloud server 111 can periodically poll the task database system 105 and/or the activity database server 106 using a data poller 601 to retrieve emails associated with all open tasks in the task database system for a sales team or for a number of sales teams in a sales organization. The data poller 601 can be a software component configured to execute one or more operations as described a above in this disclosure (e.g., one or more operations described in FIG. 1 and FIG. 4) to retrieve email messages from the task database system 105 and/or the activity database server 106. A sales team email database 603 can be provided in the cloud server 111 to store the emails, their associated domains 607, and their addresses 609.

With the database 603 in the cloud server 111, the pending activity reminder module 121 can directly retrieve emails, and their associated addresses and email domains related to open tasks assigned to a particular user from that database 603, instead of from the activity database server 106 or the task database system 106. The activity database server 106 can include a large volume of data, including emails and meeting activities, and the task database system 105 can include tasks in various stages and activity data. Therefore, the pending activity reminder module 121 can boost its performance by directly retrieving relevant information from the database 603 which contains pre-fetched and preprocessed emails and their associated metadata.

Figure 7:
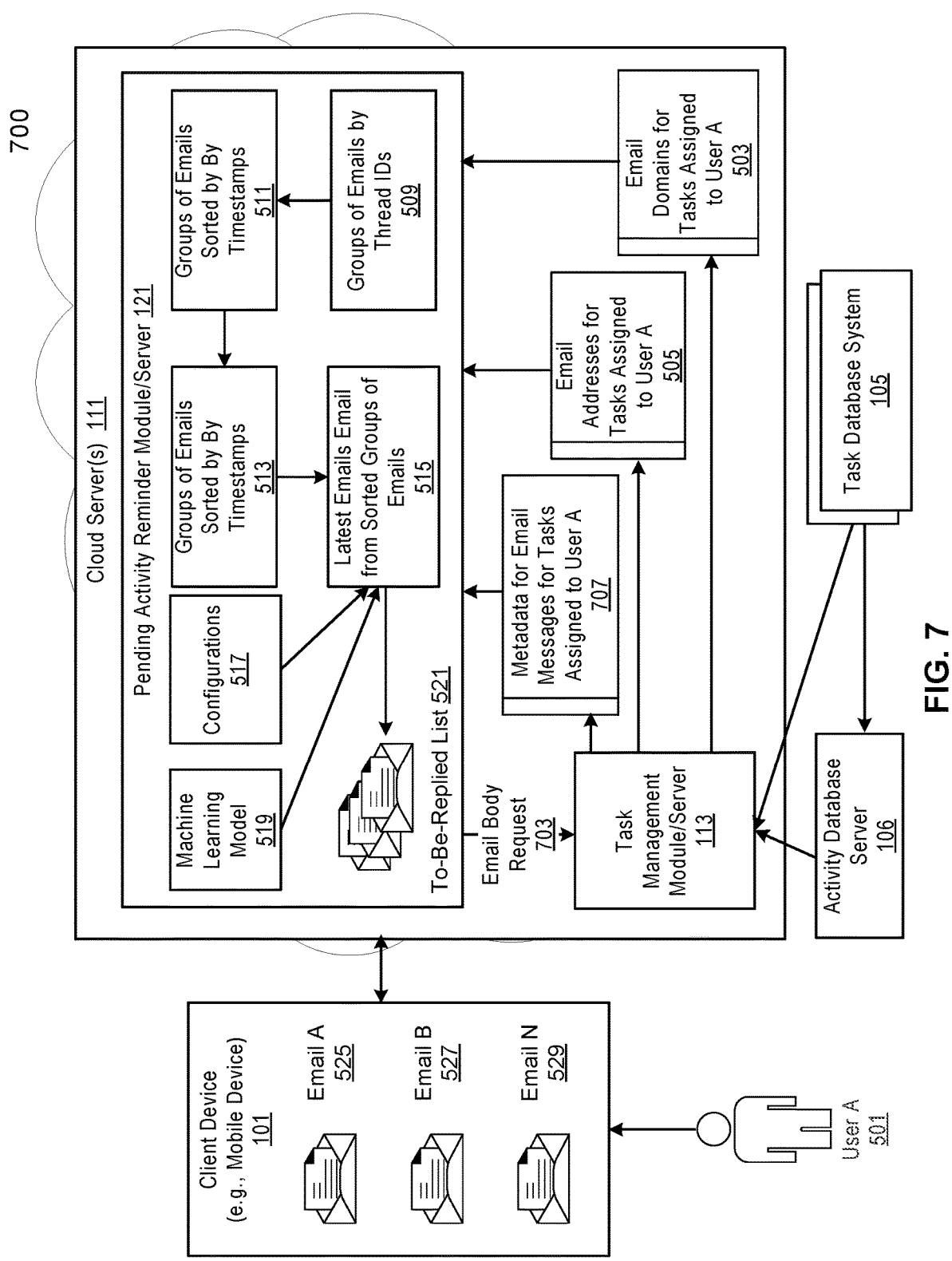
FIG. 7 illustrates another example system for reminding users of emails that each need a response in accordance with another embodiment of the invention.

FIG. 7 illustrates another example system 700 for reminding users of emails that each need a response in accordance with another embodiment of the invention.

In this example, in response to the user logging on to the cloud server 111, the pending activity reminder module 121 can retrieve metadata 707 for email messages exchanged between one or more source contacts and one or more target contacts associated with the open tasks assigned to user A 501. In one one embodiment, the metadata for each email message can include one of more of a timestamp indicating when the email was received or sent, a sender, a receiver, a source email domain, a target email domain, or a subject line.

In the example implementation, the pending activity reminder module 121 does not request 703 bodies of emails related to open tasks assigned to user A 501 until after the email list 515 is generated. By delaying the retrieval of a number of email bodies, which may not needed for determining the to-be-replied list 521 until the email list 515 is generated, the pending activity reminder module 121 can reduce data transfer between the cloud server 111 and the activity data server 106, thereby improving the system performance.

FIG. 8 illustrates a process 800 for reminding users of emails that each need a response in accordance with another embodiment of the invention.

As shown in FIG. 8, process 800 may be performed by processing logic that includes software, hardware, or a combination thereof. For example, process 800 may be performed by the pending activity reminder module 121 and one or more other modules in the cloud server 111.

Referring to FIG. 8, in operation 801, processing logic (e.g., the cloud server 111) receives task metadata describing one or more tasks pending to be completed from a task database hosted by a task management server over a network, the task management server being a different server than the cloud server.

In operation 803, the processing logic performs the following operations for each of the one or more tasks: determining based on the task metadata a plurality of user identifiers (IDs) identifying one or more source contacts and one or more target contacts, determining based on the user IDs one or more source email domains for the one or more source contacts, and one or more target email domains for the one or more target contacts, accessing an email server associated with the task over the network to retrieve email metadata describing a plurality of emails associated with the task based on the source and target email domains, the email server being a separate server than the cloud server and the task management server, and identifying one or more email threads associated with the task based on the email metadata, each email thread including one or more emails.

In operation 805, the processing logic performs the following operations for each of the email threads: identifying a latest email within the email thread based on a timestamp of the email that was sent by a user ID associated with one of the target email domains, determining that the latest email has not been replied by a user ID associated with any one of the source email domains, performing a content analysis on content of the latest email using a machine-learning model, and transmitting a notification to one or more source email addresses associated with the task.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
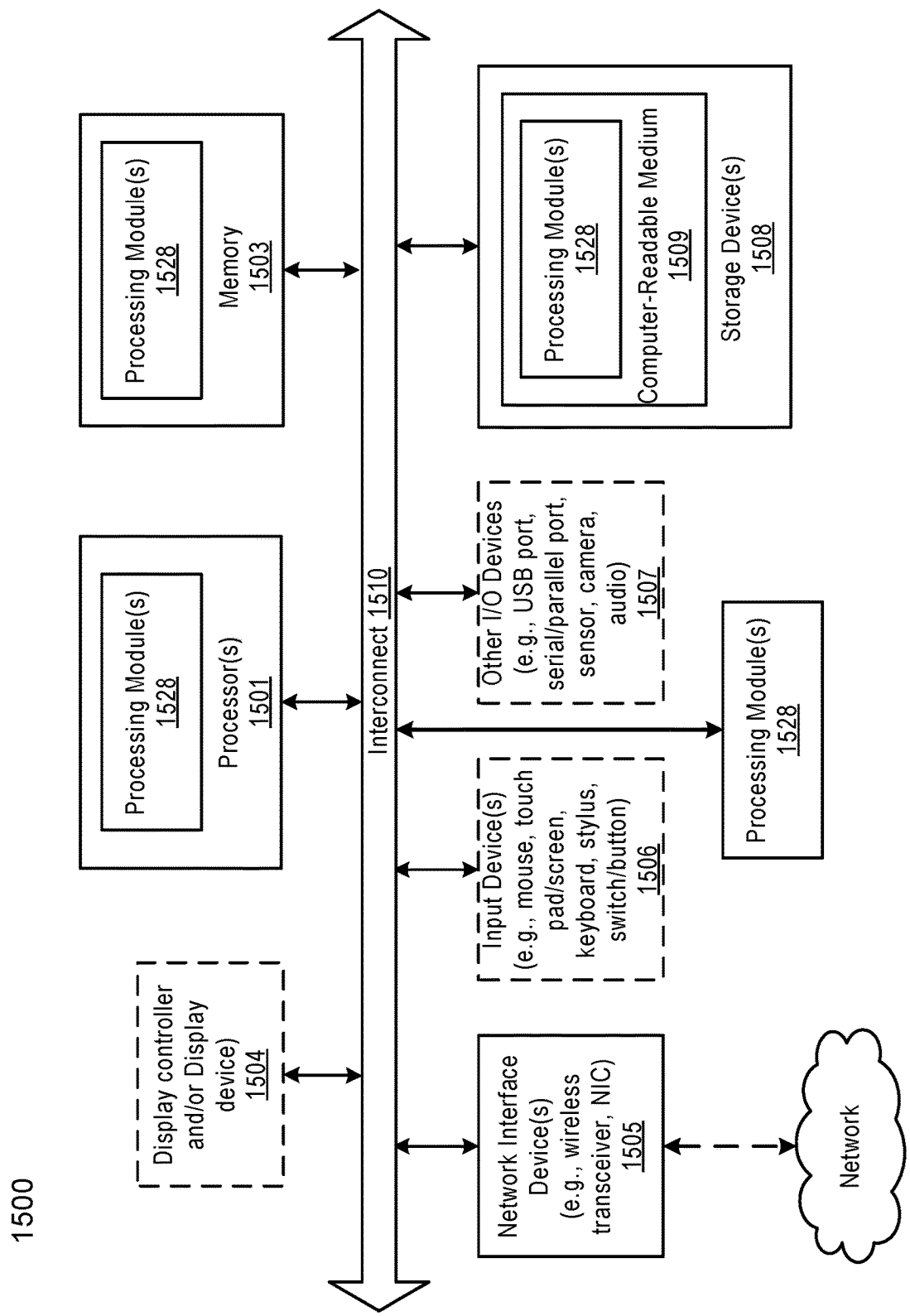
FIG. 9 is a block diagram illustrating an example of a data processing system which may be used with one or more embodiments of the invention.

FIG. 9 is a block diagram illustrating an example of a data processing system which may be used with one or more embodiments of the invention.

For example, system 1500 may represent any of data processing systems described above performing any of the processes of methods described above, such as, for example, client devices 101-102 and servers 105-107 and 111 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, task manager 210, activity manager 220, and the pending activity reminder module 121, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for identifying and notifying users of pending emails, the method comprising:

retrieving, by a cloud server, task metadata describing a task pending to be completed from a task database hosted by a task management server over a network, the task management server being a different server than the cloud server, wherein the task metadata includes source contact information and target contact information associated with the task;

determining, based on the task metadata, a plurality of user identifiers (IDs) identifying one or more source contacts and one or more target contacts associated with the task;

retrieving, from a persistent storage device, a source set of activity identification rules and a target set of activity identification rules;

determining one or more source email domains for the one or more source contacts based on the source contact information and the source set of activity identification rules;

determining one or more target email domains for the one or more target contacts based on the target contact information and the target set of activity identification rules;

accessing an email server over the network to retrieve email metadata based on the one or more source email domains and the one or more target email domains, the email server being a separate server than the cloud server and the task management server, the email metadata describing a plurality of emails associated with the task;

identifying a plurality of email threads associated with the task from the plurality of emails based on the email metadata, each email thread including one or more emails exchanged between one of the one or more source contacts and one or more of the one or more target contacts;

for each of the plurality of email threads associated with the task,
- identifying, within the email thread and based on a timestamp of the email, a latest email that was sent by a user ID associated with one of the one or more target email domains,
- determining that the latest email has not been replied to by a user ID associated with any one of the one or more source email domains,
- subsequent to the determining that the latest email has not been replied to by the user ID, retrieving a body of the latest email from the email server,
- performing a content analysis on content of the body of the latest email using a machine-learning model to determine whether the latest email needs a response, and
- transmitting a notification to one or more source email addresses associated with the task in response to determining that the latest email needs a response; and creating a list of emails from the plurality of email threads associated with the task based on the notification associated with each email thread, wherein the list of emails includes only one email from each of one or more of the plurality of email threads associated with the task, wherein each email in the list of emails has been determined to need a response; and sending the list of emails to a client device, wherein the client device displays the list of emails in a graphical user interface for a user to respond to, and periodically alerts the user of any email in the list of emails that the user needs to respond to.

2. The method of claim 1, further comprising:
removing one or more emails with a timestamp more recent than a preconfigured timestamp from consideration in creating the list of emails.

3. The method of claim 1, wherein each email in the list of emails includes metadata of the email without a body, the metadata including one or more of the following: a timestamp, a sender and a receiver, a source email domain, a target email domain, or a subject line.

4. The method of claim 1, wherein emails in the plurality of email threads exchanged between the one or more source email domains and the one or more target email domains are retrieved from the task database in response to the user logging on to an application with the graphical user interface.

5. The method of claim 1, wherein emails in the plurality of email threads exchanged between the one or more source email domains and the one or more target email domains are retrieved from a database in the cloud server, wherein the database is periodically synchronized with an activity database server that stores emails of users.

6. The method of claim 1, wherein the machine-learning model is a neural network model.

7. The method of claim 1, wherein the one or more target contacts include a task contact and an account contact and determining the one or more target email domains for the one or more target contacts based on the target contact information and the target set of activity identification rules comprises utilizing the task contact instead of the account contact to determine the one or more target email domains based on the target set of activity identification rules.

8. The method of claim 1, further comprising:
extracting a first target email domain of the one or more target email domains from an email address of a first target contact of the one or more target contacts; and
identifying an email address of a second target contact of the one or more target contacts based on the first target email domain extracted from the email address of the first target contact.

9. The method of claim 1, wherein determining the one or more target email domains for the one or more target contacts based on the target contact information and the target set of activity identification rules comprises:
identifying a web address in the target contact information; and
utilizing the web address to determine the one or more target email domains based on the target set of activity identification rules.

10. The method of claim 1, wherein determining the one or more target email domains for the one or more target contacts based on the target contact information and the target set of activity identification rules comprises:
determining an account name associated with the task; and
accessing a name-to-domain mapping table to obtain the one or more target email domains based on the account name associated with the task.

11. The method of claim 1, wherein the one or more target contacts include a first contact and a second contact and determining the one or more target email domains for the one or more target contacts based on the target contact information and the target set of activity identification rules comprises:
determining the first contact is associated with a predetermined number of accounts, wherein the predetermined number of accounts comprises two or more accounts; and
utilizing the second contact instead of the first contact to determine the one or more target email domains based on association of the first contact with the predetermined number of accounts.

12. The method of claim 1, further comprising:
identifying an email exchanged between one of the one or more source contacts and one or more of the one or more target contacts prior to creation of the task; and
removing the email exchanged prior to creation of the task from consideration in creating the list of emails.

13. A non-transitory machine-readable storage medium having instructions stored therein, which when executed by a processor, cause the processor to perform operations, the operations comprising:
retrieving, by a cloud server, task metadata describing a task pending to be completed from a task database hosted by a task management server over a network, the task management server being a different server than the cloud server, wherein the task metadata includes source contact information and target contact information associated with the task;
determining, based on the task metadata, a plurality of user identifiers (IDs) identifying one or more source contacts and one or more target contacts associated with the task;
retrieving, from a persistent storage device, a source set of activity identification rules and a target set of activity identification rules;

determining one or more source email domains for the one or more source contacts based on the source contact information and the source set of activity identification rules;

determining one or more target email domains for the one or more target contacts based on the target contact information and the target set of activity identification rules;

accessing an email server over the network to retrieve email metadata based on the one or more source email domains and the one or more target email domains, the email server being a separate server than the cloud server and the task management server, the email metadata describing a plurality of emails associated with the task;

identifying a plurality of email threads associated with the task from the plurality of emails based on the email metadata, each email thread including one or more emails exchanged between one of the one or more source contacts and one or more of the one or more target contacts;

for each of the plurality of email threads associated with the task,
identifying, within the email thread and based on a timestamp of the email, a latest email that was sent by a user ID associated with one of the one or more target email domains,
determining that the latest email has not been replied to by a user ID associated with any one of the one or more source email domains,
subsequent to the determining that the latest email has not been replied to by the user ID, retrieving a body of the latest email from the email server,
performing a content analysis on content of the body of the latest email using a machine-learning model to determine whether the latest email needs a response, and
transmitting a notification to one or more source email addresses associated with the task in response to determining that the latest email needs a response; and creating a list of emails from the plurality of email threads associated with the task based on the notification associated with each email thread, wherein the list of emails includes only one email from each of one or more of the plurality of email threads associated with the task, wherein each email in the list of emails has been determined to need a response; and sending the list of emails to a client device, wherein the client device displays the list of emails in a graphical user interface for a user to respond to, and periodically alerts the user of any email in the list of emails that the user needs to respond to.

14. The non-transitory machine-readable storage medium of claim 13, further comprising:
removing one or more emails with a timestamp more recent than a preconfigured timestamp from consideration in creating the list of emails.

15. The non-transitory machine-readable storage medium of claim 13, wherein each email in the list of emails includes metadata of the email without a body, the metadata including one or more of the following: a timestamp, a sender and a receiver, a source email domain, a target email domain, or a subject line.

16. The non-transitory machine-readable storage medium of claim 13, wherein emails in the plurality of email threads exchanged between the one or more source email domains and the one or more target email domains are retrieved from the task database in response to the user logging on to an application with the graphical user interface.

17. The non-transitory machine-readable storage medium of claim 13, wherein emails in the plurality of email threads exchanged between the one or more source email domains and the one or more target email domains are retrieved from a database in the cloud server, wherein the database is periodically synchronized with an activity database server that stores emails of users.

18. The non-transitory machine-readable storage medium of claim 13, wherein the machine-learning model is a neural network model.

19. A data processing system operating as a first server, the system comprising:
a processor; and
a memory coupled to the processor to store instructions, which when executed by the processor, cause the processor to perform operations, the operations including
retrieving, by a cloud server, task metadata describing a task pending to be completed from a task database hosted by a task management server over a network, the task management server being a different server than the cloud server, wherein the task metadata includes source contact information and target contact information associated with the task;
determining, based on the task metadata, a plurality of user identifiers (IDs) identifying one or more source contacts and one or more target contacts associated with the task;
retrieving, from a persistent storage device, a source set of activity identification rules and a target set of activity identification rules;
determining one or more source email domains for the one or more source contacts based on the source contact information and the source set of activity identification rules;
determining one or more target email domains for the one or more target contacts based on the target contact information and the target set of activity identification rules;
accessing an email server over the network to retrieve email metadata based on the one or more source email domains determined based on the or more source contacts and the one or more target email domains determined based on the one or more target contacts, the email server being a separate server than the cloud server and the task management server, the email metadata describing a plurality of emails associated with the task;
identifying a plurality of email threads associated with the task from the plurality of emails based on the email metadata, each email thread including one or more emails exchanged between one of the one or more source contacts and one or more of the one or more target contacts;
for each of the plurality of email threads associated with the task,
identifying, within the email thread and based on a timestamp of the email, a latest email that was sent by a user ID associated with one of the one or more target email domains,
determining that the latest email has not been replied to by a user ID associated with any one of the one or more source email domains, subsequent to the determining that the latest email has not been replied to by the user ID, retrieving a body of the latest email from the email server, performing a content analysis on content of the body of the latest email using a machine-learning model to determine whether the latest email needs a response, and transmitting a notification to one or more source email addresses associated with the task in response to determining that the latest email needs a response; and creating a list of emails from the plurality of email threads associated with the task based on the notification associated with each email thread, wherein the list of emails includes only one email from each of one or more of the plurality of email threads associated with the task, wherein each email in the list of emails has been determined to need a response; and sending the list of emails to a client device, wherein the client device displays the list of emails in a graphical user interface for a user to respond to, and periodically alerts the user of any email in the list of emails that the user needs to respond to.

20. The system of claim 19, wherein the one or more emails with a timestamp more recent than a preconfigured timestamp is removed from consideration in creating the list of emails.

\* \* \* \* \*